United States Patent [19]

Fukada et al.

[11] 4,279,160
[45] Jul. 21, 1981

[54] PRESSURE MEASURING APPARATUS WITH TEMPERATURE COMPENSATING MEANS

[75] Inventors: Tomihiro Fukada, Nagareyama; Mitsuru Kamei, Mito, both of Japan

[73] Assignee: Doryokuro Kakunenryo Kaihatsu Jigyodan, Tokyo, Japan

[21] Appl. No.: 87,530

[22] Filed: Oct. 23, 1979

[30] Foreign Application Priority Data

Oct. 25, 1978 [JP] Japan .................. 53-146856[U]

[51] Int. Cl.$^3$ .............................. G01L 19/04
[52] U.S. Cl. ........................ 73/708; 73/706; 73/719
[58] Field of Search .............. 73/708, 706, 716, 717, 73/718, 719, 720, 721, 722, 4 R

[56] References Cited

U.S. PATENT DOCUMENTS

| | | | |
|---|---|---|---|
| 3,286,527 | 11/1966 | Schelten-Peterson et al. | 73/716 |
| 3,623,371 | 11/1971 | Jullien-Davin | 73/708 |
| 3,956,937 | 5/1976 | Lawford et al. | 73/706 |
| 3,986,399 | 10/1976 | Satou et al. | 73/716 |

Primary Examiner—Donald O. Woodiel
Attorney, Agent, or Firm—Fleit & Jacobson

[57] ABSTRACT

A pressure measuring apparatus using process transmission media and comprising measuring and compensation systems. These systems have the substantially same construction which comprises a pressure receiving portion, a pressure transmitting portion and a pressure detecting portion. The pressure transmitting portion is divided into two sections, each of them contains a liquid NaK and a heat-resisting inert liquid, respectively, as pressure transmission media. A pressure of a fluid to be measured which is introduced into the pressure receiving portion of the measuring system is transmitted through the transmitting portion to the pressure detecting portion where the pressure is detected. A pressure of a gas introduced into the pressure receiving portion of the compensation system is detected in the pressure detecting portion of the compensation system in a same manner. The temperature compensation is conducted by subtracting a detected pressure in the compensation system from that in the measuring system.

6 Claims, 2 Drawing Figures

PRESSURE MEASURING APPARATUS WITH TEMPERATURE COMPENSATING MEANS

BACKGROUND OF THE INVENTION

The present invention relates to a pressure measuring apparatus used, for example, in a liquid metal cooled reactor, and more particularly to a pressure measuring apparatus using pressure transmission media and providing with temperature compensating means.

A liquid metal used, for example, in a fast breeder has a high temperature and actively reacts with water and oil. Therefore, the pressure of the liquid metal is indirectly measured using, as pressure transmission media, NaK (alloy of sodium and potassium) and a heat-resisting inert liquid such as silicone oil, which are in the form of a liquid at room temperature.

FIG. 1 shows a conventional pressure gauge of this kind. It is divided by partitions into three, i.e. a pressure receiving portion 1, a pressure transmitting portion 2, and a pressure detecting portion 3. The pressure transmitting portion 2 is divided by a pressure transmission wall 4 into two, i.e. a capillary tube 5 on the side of the pressure receiving portion 1, which contains a liquid NaK alloy 6, and a capillary tube 7 on the side of the pressure detecting portion 3, which contains silicone oil.

A liquid metal 9, a fluid to be measured, is introduced into the pressure receiving portion 1. The pressure of the liquid metal 9 is applied to a pressure receiver 10 consisting of a diaphragm or bellows and forming the partition between the pressure receiving portion 1 and pressure transmitting portion 2. The pressure is then transmitted to the pressure detecting portion 3 via the pressure transmission media, i.e. the liquid NaK alloy 6 and silicone oil 8. The pressure transmitted to a partition 11 consisting of a diaphragm or bellows between the pressure detecting portion 3 and pressure transmitting portion 2 is converted into an electric signal in a pressure detector 12 consisting of a strain gauge attached to the partition 11. The thus converted electric signal is thereafter measured. The strain gauge may, of course, be substituted by some other pressure detector like a bourdon pressure gauge, which is provided in the pressure detecting portion 3.

In such a conventional pressure gauge, however, the volumes of the sealed NaK and silicone oil are varied with changes in the ambient temperature and the temperature of the fluid to be measured. This causes variations in pressure indications as well as measurement errors.

SUMMARY OF THE INVENTION

An object of the present invention is to eliminate the above-mentioned drawbacks encountered in conventional pressure gauges.

Another object of the present invention is to provide a pressure measuring apparatus using pressure transmission media, which is free from measurement errors even when the volumes of the pressure transmission media are varied due to changes in the ambient temperature and temperature of a fluid to be measured.

According to the present invention, these objects are accomplished by providing, in addition to a measuring system consisting of a conventional pressure detecting gauge using pressure transmission media, a compensation system which has substantially the same construction as the measuring system and is disposed in substantially the same surrounding as that in which the measuring system is disposed. The compensation system contains in its pressure transmitting portion a liquid NaK alloy and a heat-resisting inert liquid, the volumes of which are equal to those contained in the pressure transmitting portion of the measuring system. A pressure receiving portion of the compensation system contains a gas such as, for example, atmospheric air, in place of the fluid to be measured in the measuring system. Thus, a pressure measuring apparatus of the present invention which comprises the measuring and compensation systems permits carrying out temperature compensation by subtracting a detected pressure in the compensation system from that in the measuring system.

The above and other objects as well as advantageous features of the present invention will become clear from the following description of a preferred embodiment taken in conjunction with the accompanying drawings.

PREFERRED EMBODIMENT OF THE INVENTION

Figure 2:
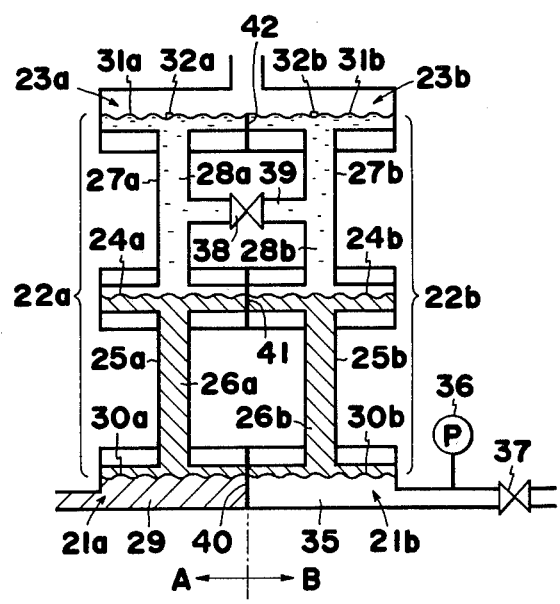
FIG. 2 shows a pressure measuring apparatus according to a preferred embodiment of the present invention.

Referring to FIG. 2 which shows an embodiment of a pressure measuring apparatus using pressure transmission media according to the present invention, a measuring system A and a compensation system B which have substantially the same construction are disposed close to each other.

Figure 1:
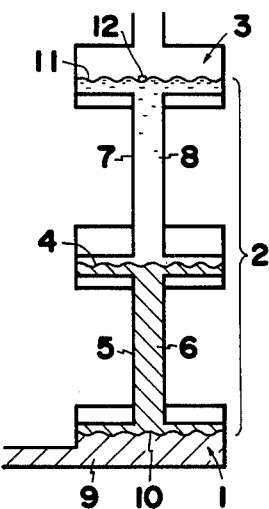
FIG. 1 shows a conventional pressure gauge using pressure transmission media.

The measuring system A has the same construction as a conventional pressure gauge shown in FIG. 1 and is divided by partitions into three, i.e. a pressure receiving portion 21a, a pressure transmitting portion 22a, and a pressure detecting portion 23a. The pressure transmitting portion 22a is divided by a pressure transmission wall 24a into two, i.e. a capillary tube 25a on the side of the pressure receiving portion 21a, which contains a liquid NaK alloy 26a, and a capillary tube 27a on the side of the pressure detecting portion 23a, which contains a heat-resisting inert liquid 28a.

A liquid metal 29 to be measured is introduced into the pressure receiving portion 21a. A pressure of the liquid metal 29 is applied to a pressure receiver 30a consisting of a diaphragm or bellows and forming the partition between the pressure receiving portion 21a and pressure transmitting portion 22a. The pressure is transmitted to the pressure detecting portion 23a via the liquid NaK alloy 26a and heat-resisting inert liquid 28a.

The pressure transmitted to the partition 31a consisting of a diaphragm or bellows and provided between the pressure detecting portion 23a and pressure transmitting portion 22a is converted into an electric signal in a pressure detector 32a consisting of a strain gauge or the like attached to the partition 31a. The thus converted electric signal is thereafter measured.

The strain gauge may, of course, be substituted by some other pressure detector like a bourdon pressure tube, which is provided in the pressure detecting portion 23a.

The compensation system B is constructed in the same manner as the measuring system A except the pressure receiving portion 21b. Namely, the compensation system B has a pressure transmitting portion 22b which continues from the pressure receiving portion 21b, and a pressure detecting portion 23b. The pressure transmitting portion is divided by a pressure transmission wall 24b into two, i.e. a capillary tube 25b on the side of the pressure receiving portion 21b, which contains NaK, and a capillary tube 27b on the side of the pressure detecting portion 23b, which contains a heat-resisting inert liquid 28b. A pressure detector 32b, which is the same as that in the measuring system A, and which consists of a strain gauge or the like, is provided on the partition 31b disposed between the pressure detecting portion 23b and pressure transmitting portion 22b.

The compensation system B is made of the same material and has the same dimensions as those of the measuring system A. In addition, the volumes of the NaK and heat-resisting inert liquid sealed in the capillary tubes 25b, 27b are equal to those of the pressure transmitting media in the measuring system A. The measuring system A and compensation system B are isolated by isolating walls 40, 41 and 42.

It is necessary that the heat-resisting inert liquid, one of the pressure transmitting media used in the present invention, be hardly deteriorated by the ambient temperature of a place of installation of this apparatus or the temperature of a fluid to be measured and that this liquid hardly reacts with a fluid to be measured and NaK. For example, silicone oil, may preferably be used for this purpose.

A gas 35 is introduced into the pressure receiving portion 21b of the compensation system B and the pressure of the gas is then transmitted to the pressure transmitting portion 22b via a pressure receiver 30b. The pressure receiving portion 21b is provided with a pressure gauge 36 and a valve 37 for controlling the flow of the gas 35. The gas to be introduced into the pressure receiving portion 21b is a gas the temperature and pressure of which can be controlled such as, for example, atmospheric air.

The capillary tubes 27a, 27b, which are filled with the heat-resisting inert liquid 28a, 28b, in the pressure transmitting portions 22a, 22b of the measuring system and compensation system, respectively, are connected to each other with an equalizing pipe 39 having a valve 38. While an ordinary measurement is conducted, the valve 38 is completely closed so that the measuring system A and compensation system B are in an isolated state.

It is preferable that the measuring system A and compensation system B be disposed close to each other as mentioned above because both of the systems can then be kept in substantially equal surroundings, i.e. at substantially equal temperature. When the measuring system A and compensation system B are disposed in a spaced manner, it is necessary that the temperatures thereof be controlled to the same level by some means.

Measurement of pressure is conducted as follows.

Assuming that indication values on the pressure detector 32a in the measuring system, pressure detector 32b in the compensation system and pressure gauge 36 in the pressure receiving portion 21b are $P_1$, $P_2$ and $P_3$, respectively, the pressure P of the liquid metal 29 to be measured is:

$$P = P_1 - P_2 + P_3.$$

When the gas in the pressure receiving portion 21b of the compensation system is atmospheric air and $P_3$ is atmospheric pressure (0 kg/cm$^2$G), P is a guage pressure. Such a subtraction can be automatically conducted by a subtracter if a pressure to be measured can be detected as an electric signal like a strain output.

The principle of temperature correction resides in the following.

NaK and silicone oil in a conventional pressure gauge are expanded or contracted due to variations in temperatures as mentioned above so that an indication value varies. On the contrary, in a pressure measuring apparatus according to the present invention, the compensation system B is provided in addition to the measuring system A, and these systems have the same construction. Namely, the volumes of heat-resisting inert liquid and NaK in one of these systems are equal to those of the same materials in the other, and the diaphragms and capillary tubes in the systems are made in accordance with the same specifications. Therefore, variations in volumes of these materials and in dimensions of the parts of these systems are equal. Consequently, the following relation is established.

Assume that indicated pressure values at temperatures of $T_1$ and $T_2$ are as follows;

| | temperature $T_1$ | $T_2$ |
|---|---|---|
| on the pressure detector 32a in the measuring system | $P_1$ | $P_1 + \Delta P_1$ |
| on the pressure detector 32b in the compensation system | $P_2$ | $P_2 + \Delta P_2$ |
| on the pressure gauge 36 in the pressure receiving portion of the compensation system (with the valve 37 opened) | $P_3$ | $P_3$ |

Then, since the temperature in the measuring system A and compensation system B are varied in the same manner for the above-mentioned reasons, $\Delta P_1$ equals $\Delta P_2$. When the temperature $T_1$ is changed to $T_2$, the pressure in the compensation system B is changed by $\Delta P_2$. $P_3$ is constant. Consequently, $\Delta P_2$ can be expressed by the formula, $$\Delta P_2 = P_2 - P_3.$$

Therefore, the pressure P in the pressure receiving portion 21a of the measuring system can be expressed by the formula, $$P = P_1 - \Delta P_1 = P_1 - P_2 + P_3$$

$$P(\text{gauge pressure}) = P_1 - P_2.$$

This shows that the pressure P can be measured irrespective of temperature.

When a diaphragm is used in the pressure receiving portions, the quality of the pressure measuring apparatus tends to be changed with the lapse of time. Since the above embodiment is provided with the equalizing pipe 39 having the valve 38, whereby measuring system and compensation system are connected to each other, an in situ calibration can be conducted easily as the apparatus is left installed in a required place. Thus, the accuracy and reliability of measurement are improved. Namely, since the pressure gauge 36 is in a gaseous atmosphere, the calibration and replacement thereof can be easily effected. Assuming that the indication of pressure $P_3$ on the pressure gauge 36 is correct, the indication $P_2$ on the pressure detector 32b in the compensation system may be calibrated on the basis thereof. The indication on the pressure detector 32a may then be calibrated on the pressure detector 32a may then be calibrated while keeping the valve 38 opened. The pressure $P_3$ in the pressure receiving portion 21b of the compensation system serves as a reference pressure for the in situ calibration.

A pressure measuring apparatus according to the present invention may be used to measure the pressure of not only a liquid metal but also a gas. The apparatus may be used for a differential pressure gauge and a liquid level gauge.

Since a pressure measuring apparatus according to the present invention is constructed as described above, an indication value is not varied even when the temperature in the NaK containing section or heat-resisting inert liquid containing section is changed. This allows the accuracy of measurement to be improved. It was necessary in the past that the pressure measuring gauge of this kind should be designed such that the gauge contains as small as possible a volume of NaK and a heat-resisting inert liquid to thereby minimize the influence of temperatures on the gauge. However, a pressure measuring apparatus of the present invention is not influenced by temperatures at all and thus, it has a high degree of freedom of designing and can be produced by a symple method. As a result, a gas can be prevented from entering the capillary tubes. Since a pressure measuring apparatus of the present invention is not influenced by temperatures, it can be installed close to a coolant loop of a reactor. This allows a responding speed of the apparatus to be increased and causes many other excellent effects.

The present invention is not, of course, limited to the above-described embodiment; it may be modified in various ways within the scope of the appended claims.

What is claimed is:

1. A pressure measuring apparatus using pressure transmission media and having a measuring system divided by partitions into three, i.e. a pressure receiving portion, a pressure transmitting portion and a pressure detecting portion, said pressure transmitting portion being divided by a pressure transmission wall into two, i.e. a section on the side of said pressure receiving portion which contains a liquid NaK alloy, and a section on the side of said pressure detecting portion which contains a heat-resisting inert liquid, so that a pressure of a fluid to be measured which is introduced into said pressure receiving portion is transmitted to said pressure detecting portion through the pressure transmitting portion so as to be measured with a pressure detector provided in said pressure detecting portion, characterized in that said apparatus further comprises a compensation system which has substantially the same construction as the measuring system and is disposed in substantially the same surroundings as that in which the measuring system is disposed, and that the compensation system contains in its pressure transmitting portion a liquid NaK alloy and a heat-resisting inert liquid, the volumes of which are equal to those contained in the pressure transmitting portion of the measuring system, and contains in its pressure receiving portion a gas, whereby the apparatus permits carrying out temperature compensation by subtracting a detected pressure in the compensation system from that in the measuring system.

2. The apparatus according to claim 1, wherein said measuring system and said compensation system are disposed close to each other.

3. The apparatus according to claim 1, wherein the heat-resisting inert liquid is silicone oil.

4. The apparatus according to claim 1, wherein each of the partitions comprises a diaphram or a bellows.

5. The apparatus according to claim 1, wherein the pressure detector provided in the pressure detecting portion comprises a strain or a bourdon tube pressure gauge.

6. The apparatus according to claim 1, wherein said pressure receiving portion of the compensation system is provided with a pressure gauge, and the pressure transmitting portion containing the heat-resisting inert liquid of said measuring system and the pressure transmitting portion containing the heat-resisting inert liquid of said compensation system are connected to each other with an pipe provided with a valve therein, whereby the apparatus permits carrying out calibration of the indication on the pressure detector in the pressure detecting portion of the compensation system.

* * * * *